(12) United States Patent
Khuc et al.

(10) Patent No.: US 6,483,909 B1
(45) Date of Patent: Nov. 19, 2002

(54) SYSTEM AND METHOD FOR PROVIDING SERVICE ASSURANCE FOR PREPAID TELECOMMUNICATION SERVICES

(75) Inventors: Minh Duy Khuc, San Jose, CA (US); Carl Milton Coppage, Harrisonville, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/044,485

(22) Filed: Jan. 11, 2002

Related U.S. Application Data

(63) Continuation of application No. 09/386,254, filed on Aug. 31, 1999.

(51) Int. Cl.[7] .................. H04M 15/00; H04M 1/24; H04M 3/08; H04M 3/22
(52) U.S. Cl. ............... 379/114.2; 379/1.02; 379/10.01; 379/10.02; 379/29.02; 379/145
(58) Field of Search ................ 379/1.01, 1.02, 379/10.01, 10.02, 13, 15.01, 22.01, 22.02, 26.02, 27.02, 27.03, 29.01, 29.02, 114.04, 114.14, 114.2, 144.03, 145

(56) References Cited

U.S. PATENT DOCUMENTS

| | | | | |
|---|---|---|---|---|
| 5,369,680 A | * | 11/1994 | Borbas et al. ................ 379/1 |
| 5,774,535 A | * | 6/1998 | Castro ..................... 379/144 |
| 5,784,406 A | * | 7/1998 | DeJaco et al. ................. 379/5 |
| 5,822,397 A | * | 10/1998 | Newman ...................... 379/6 |
| 5,933,475 A | * | 8/1999 | Coleman ...................... 379/1 |
| 5,940,472 A | * | 8/1999 | Newman et al. ............... 379/1 |
| 6,018,567 A | * | 1/2000 | Dulman ....................... 379/34 |
| 6,091,802 A | * | 7/2000 | Smith et al. .................. 379/29 |
| 6,192,108 B1 | * | 2/2001 | Mumford et al. .............. 379/9 |

\* cited by examiner

*Primary Examiner*—Binh Tieu
(74) *Attorney, Agent, or Firm*—Harley R. Ball; Steven J. Funk; Kevin D. Robb

(57) ABSTRACT

A prepaid service assurance system provides service assurance for a prepaid telecommunication system by generating a call to the prepaid telecommunication system. In response to the call, the prepaid service assurance system then receives an actual response from the prepaid telecommunication system and automatically compares the actual response with an expected response for the prepaid telecommunication system. In other embodiments, the prepaid service assurance system determines whether a modification action is needed based on the comparison of the actual response and the expected response. If the modification action is needed, the prepaid service assurance system identifies the modification action based on the determination that the modification is needed. Once the modification action is identified, the prepaid service assurance system transmits an instruction to provide the modification action for the prepaid telecommunication system.

45 Claims, 6 Drawing Sheets

SYSTEM AND METHOD FOR PROVIDING SERVICE ASSURANCE FOR PREPAID TELECOMMUNICATION SERVICES

RELATED APPLICATIONS

This application is a continuation of pending U.S. patent application Ser. No. 09/386,254, filed Aug. 31, 1999, entitled "SYSTEM AND METHOD FOR PROVIDING SERVICE ASSURANCE FOR PREPAID TELECOMMUNICATION SERVICES," which is hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunication services, and in particular, to a system that provides service assurance for prepaid telecommunication services.

2. Description of the Prior Art

In a prepaid telecommunication service, the customer caller obtains a prepaid account with a monetary amount or a period of time that is debited when a call is made. Customers have increasingly demanded more prepaid telecommunication services due to the stability of flat fee rates, the avoidance of calling collect, and the flexibility to make a call from anywhere at any time. Consequently, the systems that provide prepaid telecommunication services have become more complex and diverse.

Testing of these prepaid telecommunication systems typically has been manually intensive and time consuming. People who test simply simulate calls and report problems that need to be corrected. Prepaid telecommunication systems providers then re-deploy solutions to the reported problems in a manually intensive fashion. Prepaid telecommunication service providers have also relied on customers to report problems. The provider then reacts and corrects problems with the prepaid telecommunication service.

The problem is that the testing of the prepaid telecommunication systems has been too slow and cost ineffective. Consumption of human labor to test systems is not only expensive but also erratic. The slow testing also delays modifications and enhancements to the prepaid telecommunication service. Additionally, the prepaid telecommunication provider unfairly burdens prepaid calling customers to report problems. As the customer encounters more problems, customer satisfaction with the prepaid telecommunication service decreases.

SUMMARY OF THE INVENTION

The invention solves the above problem by providing service assurance for prepaid telecommunication services. The invention automatically generates a call to the prepaid telecommunication system. In response to the call, the invention then receives an actual response from the prepaid telecommunication system. Examples of actual responses are pre-recorded messages and voice calls. The invention automatically compares the actual response with an expected response for the prepaid telecommunication system. The expected response could be any communication from the prepaid telecommunication system that is anticipated to check the provision of the prepaid telecommunication service. By automatically comparing the actual response and the expected response, the invention checks the provision of the prepaid telecommunication service to identify problems such as incorrect messaging, timing of messages, and unacceptable quality of lines and circuit.

In other embodiments, the invention determines whether a modification action is needed based on the comparison of the actual response and the expected response. The modification action could be any action or notification for correcting any errors in the prepaid telecommunication system and/or altering the provision of the prepaid telecommunication service. Some examples of modification actions are reassigning resources in the prepaid telecommunication system, blocking calls, and changing service logic in the prepaid telecommunication system. After determining that the modification action is needed, the invention identifies the modification action based on the determination. The invention then transmits an instruction to provide the modification action for the prepaid telecommunication system.

Human testers are no longer needed to simulate calls and run through testing scenarios. The invention proactively probes for problems with the prepaid telecommunication system to provide greater service assurance. When new prepaid telecommunication service features are enhanced or modified, implementation times will be reduced due to the invention reducing testing times of the new features. Also, the invention provides self-healing of the prepaid telecommunication system by using the modification actions to correct detected errors. Thus, with greater quality of prepaid telecommunication service, customer satisfaction would improve. Less errors are exposed to the customer to avoid customer dissatisfaction. The invention also alleviates the customer burden of coming across service errors and reporting them.

DETAILED DESCRIPTION OF THE PREFERRED EMBODIMENT

Figure 1:
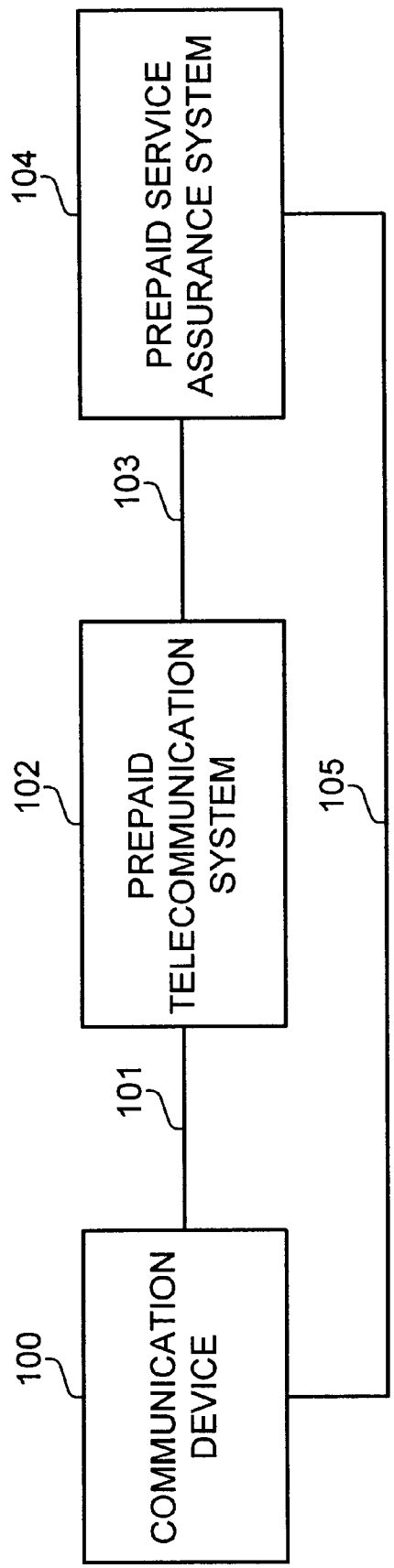
FIG. 1 is a system level block diagram of an example of the invention.
Figure 2:
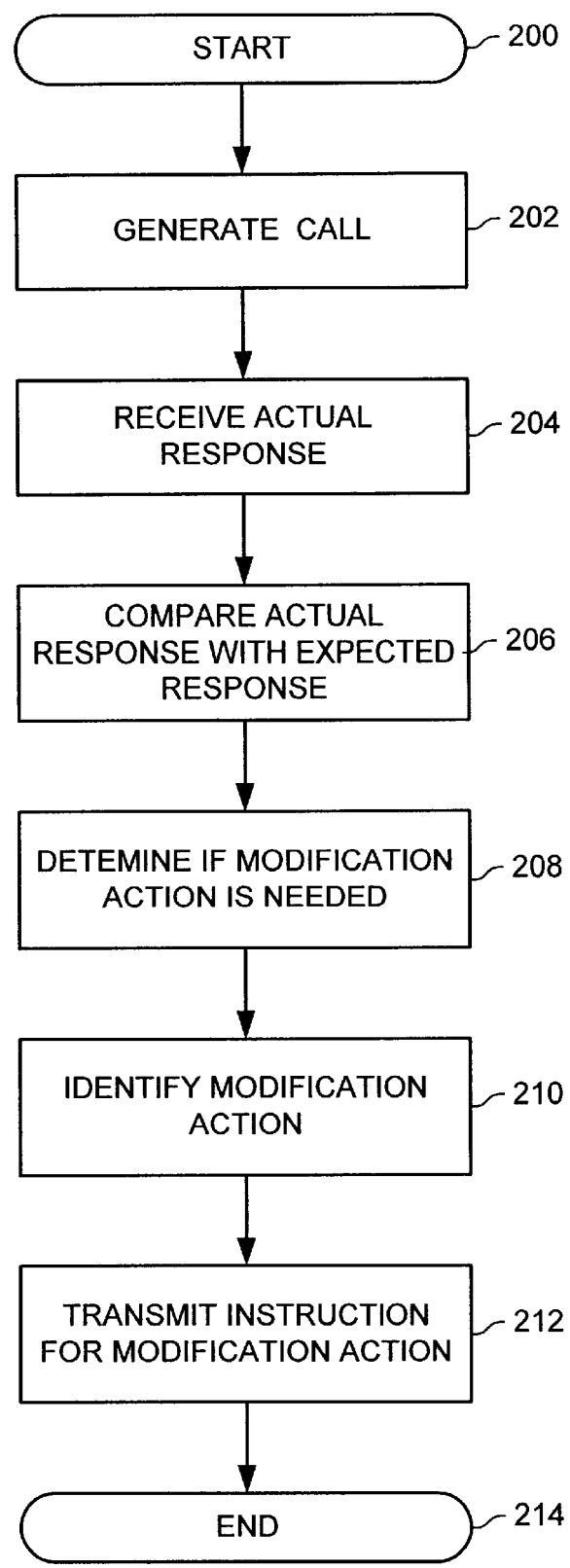
FIG. 2 is a flow chart of prepaid service assurance system operation in an example of the invention.

Prepaid System —FIGS. 1–2

FIG. 1 depicts a system level block diagram of an example of the invention. A communication device 100 is connected to a prepaid telecommunication system 102 by link 101. The communication device is also connected to a prepaid service assurance system 104 by link 103. The prepaid telecommunication system 102 is connected to the prepaid service assurance system 104 by link 105.

The communication device 100 could be any device or groups of devices that exchanges calls with the prepaid telecommunication system 102 and the prepaid service assurance system 104 and transfers actual responses from the prepaid telecommunication system 102 to the prepaid service assurance system 104. The actual response could be any communication originating from the prepaid telecommunication system 102.

Examples of actual responses are pre-recorded messages and voice calls. An example of the communication device 100 is a telephone or a switching matrix.

The prepaid telecommunication system 102 could be any system that exchanges calls with the communication device 100, provides prepaid telecommunication service, and transmits the actual responses for the prepaid service assurance system 104. Prepaid telecommunication service is where the customer caller obtains a prepaid account with a monetary amount or a period of time that is debited when a call is made. The prepaid service assurance system 104 could be any system that exchanges call with the communication device 100, receives the actual responses from the prepaid telecommunication system 102, and automatically compares the actual response with an expected response for the prepaid telecommunication service. The expected response could be any communication from the prepaid telecommunication system 102 that is anticipated to check the provision of the prepaid telecommunication service.

FIG. 2 depicts the operation of the prepaid service assurance system 104 in an example of the invention. FIG. 2 begins at step 200. In step 202, the prepaid service assurance system 104 automatically generates a call to the prepaid telecommunication system 102. The prepaid service assurance system 104 transmits the call for the prepaid telecommunication system 102 via link 103 or via link 105, the communication device 100, and link 101. In step 204, the prepaid service assurance system 104 receives the actual response from the communication device 100 in response to the call. In step 206, the prepaid service assurance system 104 automatically compares the actual response with the expected response for the prepaid telecommunication system 102.

In some embodiments of the invention, the prepaid service assurance system 104 determines whether a modification action is needed based on the comparison of the actual response and the expected response in step 208 in addition to the previous steps. The modification action could be any action or notification for correcting any errors in the prepaid telecommunication system and/or altering the provision of the prepaid telecommunication service. Some examples of modification actions are reassigning resources in the prepaid telecommunication system, blocking calls, and changing service logic in the prepaid telecommunication system. In step 210, the prepaid service assurance system 104 identifies the modification action based on the determination in step 208. In step 212, the prepaid service assurance system 104 transmits an instruction to provide the modification action for the prepaid telecommunication system 102 via link 103.

Prepaid System With Database Architecture
—FIGS. 3–6

FIGS. 3–6 disclose one embodiment of the invention, but the invention is not restricted to the configuration provided below. Those skilled in the art will appreciate numerous variations in a prepaid system configuration and operation that are within the scope of the invention. Those skilled in the art will also appreciate how the principles illustrated in this example can be used in other examples of the invention. A particular reference number in one figure refers to the same element in all of the other figures.

Figure 3:
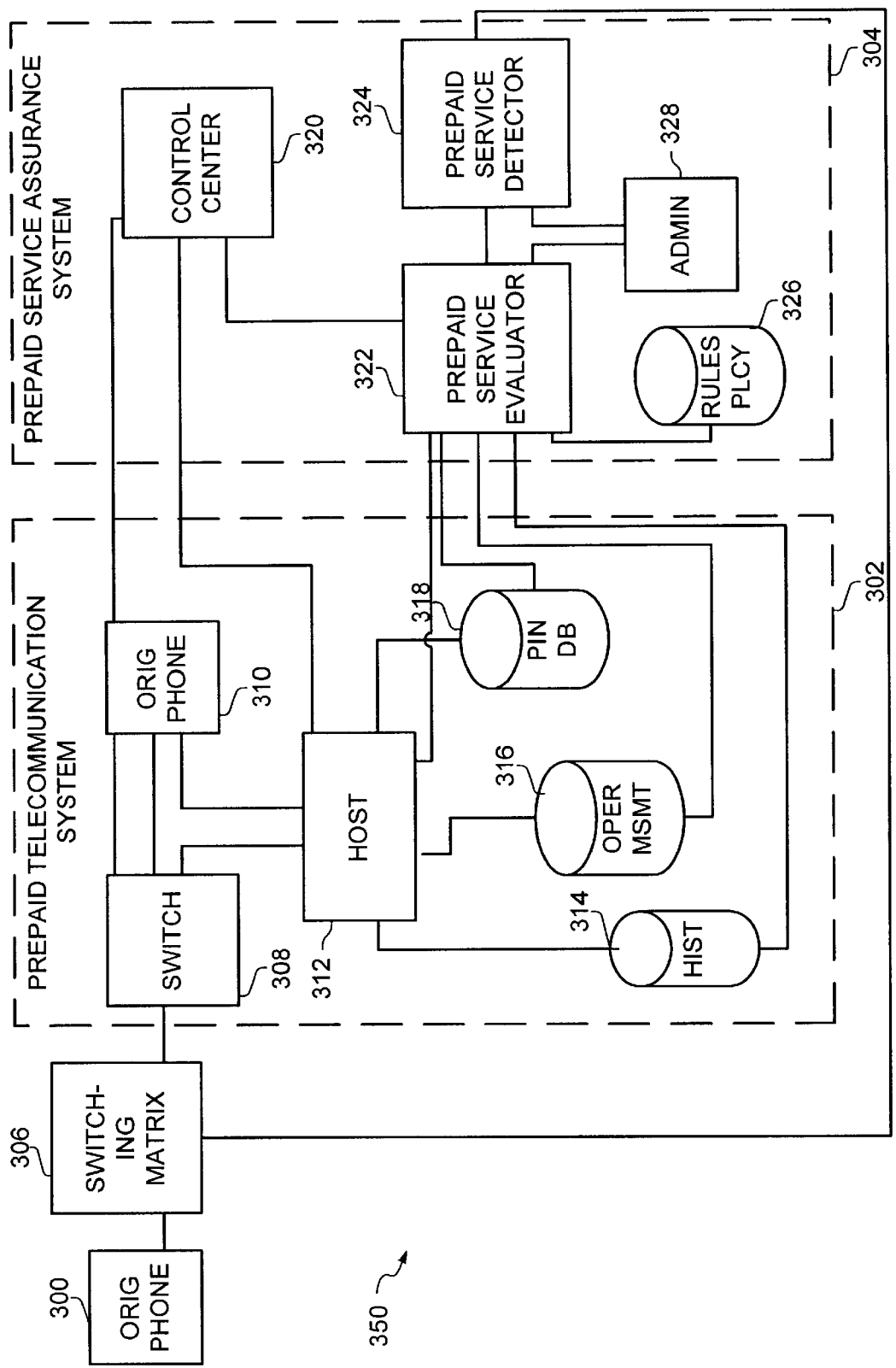
FIG. 3 is a system level block diagram for a system including a database architecture in an example of the invention.

FIG. 3 depicts a system level block diagram for a system 350 including a database architecture in an example of the invention. A prepaid telecommunication system 302 is comprised of a switch 308, a voice response unit (VRU) 310, a host 312, a history database 314, a operational measurement database 316, and a Personal Identification Number (PIN) database 318. A prepaid service assurance system 304 is comprised of a control center 320, a prepaid service evaluator 322, a prepaid service detector 324, a rules and policies database 326, and an administrator 328.

An originating telephone 300 is connected to a switching matrix 306. The switching matrix is coupled to the switch 308 and the prepaid service detector 324. The switch 308 is connected to the control center 320, the VRU 310, and the host 312. The host 312 is connected to the VRU 310, the control center 320, the prepaid service evaluator 322, the PIN database 318, the operational measurement database 316, and the history database 314. The prepaid service evaluator 322 is connected to the control center 320, the prepaid service detector 324, the administrator 328, the rules and policies database 326, the history database 314, the operational measurement database 316, and the PIN database 318. The prepaid service detector 324 is connected to the administrator 328.

Figure 4:
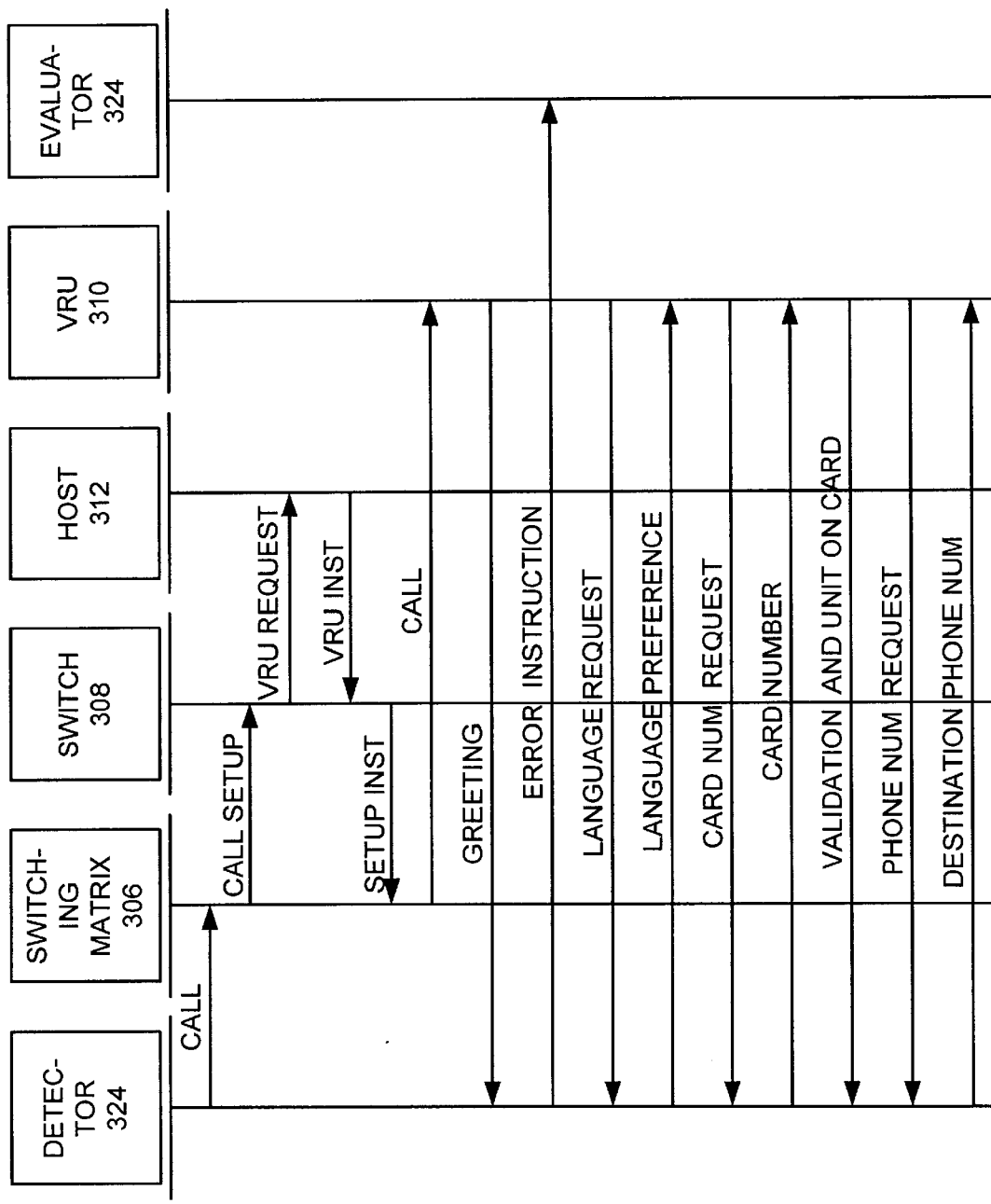
FIG. 4 is a message sequence chart for a prepaid call setup in an example of the invention.
Figure 5:
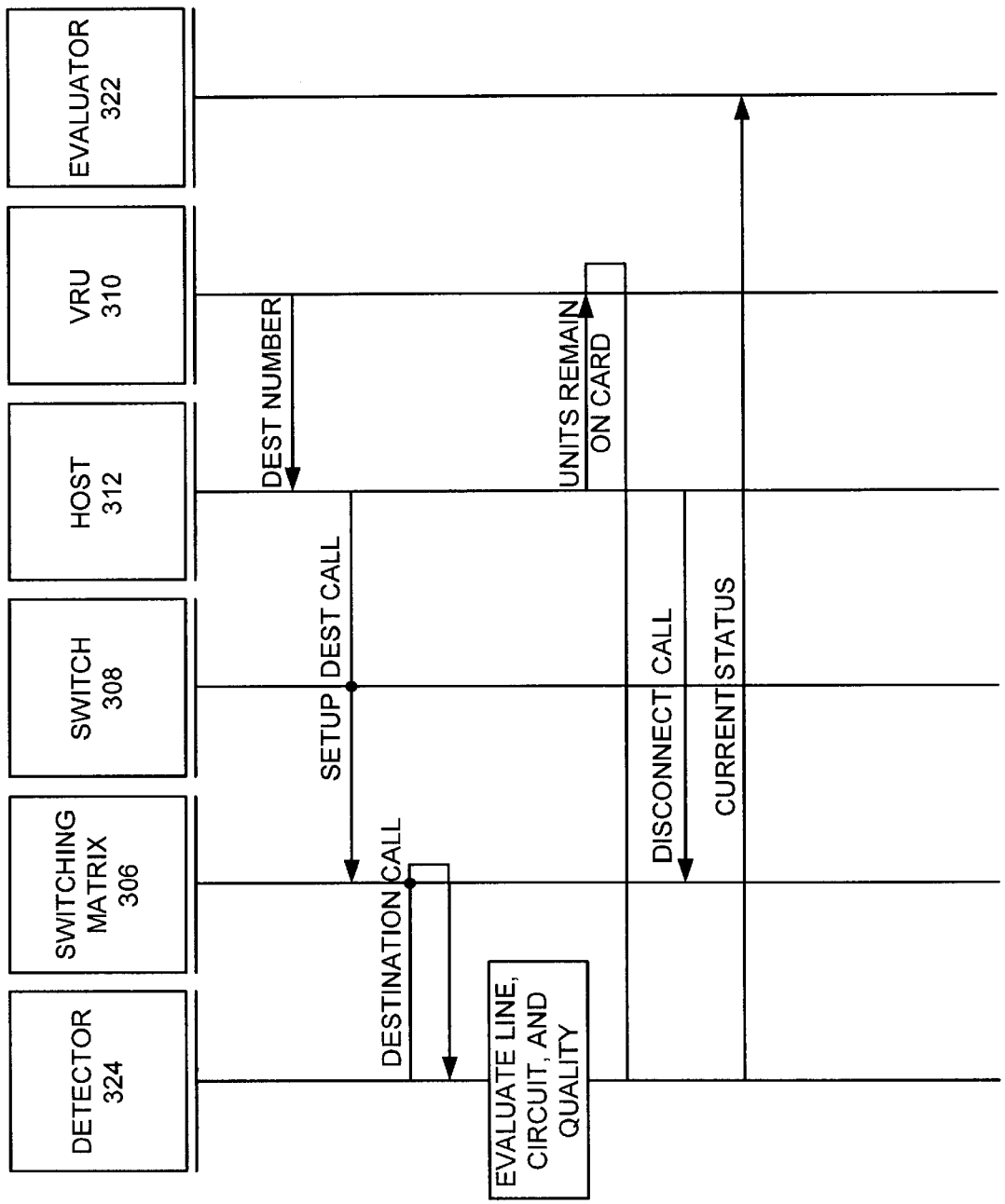
FIG. 5 is a message sequence chart for a prepaid call connection in an example of the invention.
Figure 6:
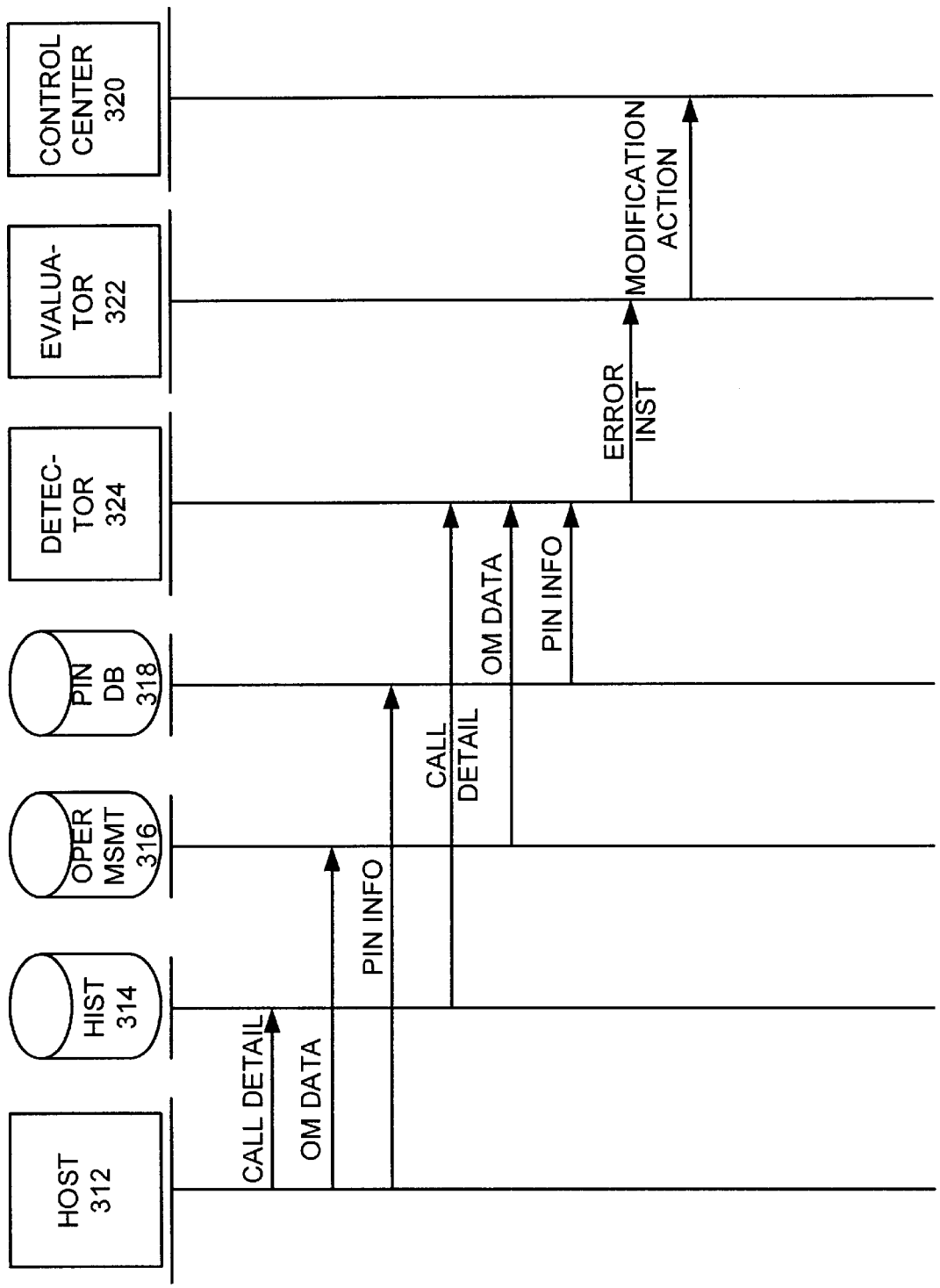
FIG. 6 is a message sequence chart for providing modification actions in an example of the invention.

FIGS. 4–6 show the operation of the system including a database architecture in an example of the invention. FIG. 4 is a message sequence chart for providing service assurance for a prepaid call setup in an example of the invention. In FIG. 4, the prepaid service detector 324 automatically generates a call to the switching matrix 306. After receiving the call, the switching matrix 306 transmits a call setup query to the switch 308. In response to receiving the call setup query, the switch 308 transmits a VRU request query for the host 312. The host 312 then transmits a VRU instruction for the switch 308 that identifies the VRU 310 to transfer the call to. The switch 308 then transmits a call setup instruction including the identification of the VRU 310 for the switching matrix 306. In response to receiving the call setup instruction, the switching matrix 306 processes the call setup instruction and extends the call toward the VRU 310.

Once the call is extended between the prepaid service detector 324 and the VRU 310, the VRU 310 plays an actual initial greeting to the prepaid service detector 324. The prepaid service detector 324 automatically compares the actual initial greeting with an expected initial greeting to detect if there is any error with the initial greeting. If there are any errors, the prepaid service detector 324 transmits an error instruction for the prepaid service evaluator 322 indicating there is a problem with the initial greeting. For the sake of simplicity in FIG. 4, the error instruction is omitted after every error that the prepaid service detector 324 detects. The VRU 310 then plays a language request message to the prepaid service detector 324. The prepaid service detector 324 automatically compares the actual language request message with an expected language request message to detect if there is any error with the language request message. The prepaid service detector 324 then transmits a language preference in response to the language request message. After the language is selected, the VRU 310 plays a prepaid calling card number request message to the prepaid service detector 324. Once again, the prepaid service detector 324 automatically compares the actual prepaid calling card number request message with an expected prepaid calling card number request message to detect if there is any error with the prepaid calling card number request message. The prepaid service detector 324 then transmits a prepaid calling card number in response to the prepaid calling card number request message.

Once a valid prepaid calling card number is received, the VRU 310 plays a validation message for the valid prepaid calling card number to the prepaid service detector 324. The VRU 310 then plays a remaining units message to indicate the remaining number of units for the valid prepaid calling card number to the prepaid service detector 324. The remaining units could be a period of time such as remaining minutes or a monetary value such as remaining dollars. The VRU 310 also plays a destination phone number request message to the prepaid service detector 324. The prepaid service detector 324 then transmits a destination phone number in response to the destination phone number request message. After each message, the prepaid service detector 324 automatically compares the actual message with an expected message to detect if there are any errors with the validation message, the remaining unit message, or the phone number request message. The prepaid service detector 324 also enters incorrect language preferences, prepaid calling card numbers, and destination phone numbers. The prepaid service detector 324 automatically compares the actual response with the expected response to detect if there are any problems with the VRU 310 handling of the preceding incorrect information.

In other embodiments of the invention, the prepaid service detector 324 transmits a domestic/international call selection in response to a domestic/international call request message before the destination phone number is entered.

FIG. 5 depicts a message sequence chart for a prepaid call connection in an example of the invention. In FIG. 5, after receiving the destination phone number, the VRU 310 transmits the destination phone number for the host 312. The host 312 receives the destination phone number and generates a setup destination call instruction. The host 312 transmits the setup destination call instruction including the destination phone number to the switching matrix 306. Using the destination phone number, the switching matrix 306 then extends back to the call prepaid service detector 324. In some embodiments of the invention, the prepaid service detector 324 transmits an instruction to attach a call progress analyzer to analyze the progress of the call such as whether a busy signal is encountered or to check if a VRU answers. The prepaid service detector 324 then checks if the call has been extended back to itself. The prepaid service detector 324 also evaluates the quality of the line and circuit of the call to detect any errors by comparing the actual quality of the line and circuit with an expected quality. If there are any errors, the prepaid service detector 324 transmits an error instruction for the prepaid service evaluator 322 indicating the error.

Once the remaining units on the prepaid calling card reach a certain amount such as one or two minutes remaining, the host 312 transmits a remaining unit warning instruction for the VRU 310. The VRU 310 then plays a remaining unit warning message for the prepaid service detector 324 to indicate the number of units remaining on the prepaid calling card. The prepaid service detector 324 automatically compares the actual remaining units warning message with the expected remaining units warning message to detect if there are any errors with the remaining units warning message. Some examples of errors could be problems with the quality of the message or the timing of the message. Once the remaining units has expired, the host 312 transmits a disconnect call instruction to the switching matrix 306. The prepaid services detector 324 also detects if the call disconnection was complete and timely. The prepaid service detector 324 may also detect errors for other functions of the prepaid telecommunication system 302 such as new call operations.

FIG. 6 is a message sequence chart for providing modification actions in an example of the invention. The modification action could be any action or notification for correcting any errors in the prepaid telecommunication system and/or altering the provision of the prepaid telecommunication service. Some examples of modification actions are reassigning resources in the prepaid telecommunication system, blocking calls, changing service logic in the prepaid telecommunication system, and providing recommendations to change the prepaid telecommunication system.

The host 312 transmits call detail records to the history database 314 after the call is completed. Some examples of the information in the call detail records are caller number, dialed number, time of call, call duration, and origin of the call.

The host 312 transmits operation management data to the operational measurement database 316. The operation management data represents any information related to the operation of the prepaid telecommunication system 302. Some examples of the operation management data are the number of callers in the prepaid telecommunication system 302 at a certain date and time, the duration of calls in the prepaid telecommunication system 302, the rate of call abandonment, and the use of communication resources. The host 312 also transmits PIN information management data to the PIN database 318. The PIN information represents any information related to the PIN number such as length of remaining units and customer name.

The prepaid services detector 324 receives call detail records from the history database 314 via the prepaid services evaluator 322. From the collection of call detail records, the prepaid services detector 324 can determine historical trends in the prepaid telecommunication system 302 in some embodiments of the invention. The prepaid services detector 324 also receives the operation management data from the operational measurement database 316 via the prepaid services evaluator 322. The prepaid services detector 324 also receives the PIN information from the PIN database 318 via the prepaid services evaluator 322. In other embodiments of the invention, the prepaid services detector 324 receives any information related to the host 312 from the host 312 via the prepaid services evaluator 322. As discussed in FIG. 4, the prepaid services detector 324 detects the errors in the prepaid telecommunication system 302 based on the actual response and an expected response for the prepaid telecommunication system. The prepaid services detector 324 then transmits the actual responses of the prepaid telecommunication system 302 and an error instruction if there are any detected errors to the prepaid services evaluator 322.

In response to receiving the error instruction, the prepaid services evaluator 322 identifies the modification action based on the comparison of the actual response and the expected response. The prepaid services evaluator 322 transmits the modification action for the prepaid telecommunication system 302 via the control center 320. In other embodiments of the invention, the control center 320 is eliminated, so the modification action will be implemented without any human approval at the control center.

In other embodiments of the invention, the prepaid services evaluator 322 transmits a repeat instruction to prepaid services detector 324 to repeat detecting the errors in the prepaid telecommunication system 302 to ensure the modification action has properly modified the prepaid telecommunication system 302. Therefore, the prepaid services evaluator 322 may re-test for errors or reconfigure the prepaid telecommunication system 302 until the optimal prepaid telecommunication service is provided.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of operating a prepaid evaluator system for providing service assurance for a prepaid telecommunication system, the method comprising:
   receiving an error instruction indicating an actual response and an expected response for a simulated call to the prepaid telecommunication system;
   determining whether a modification action is needed based on the error instruction;
   identifying the modification action based on the determination that the modification is needed; and
   transmitting a modification instruction to provide the modification action for the prepaid telecommunication system.

2. The method of claim 1 wherein the modification action comprises reassigning resources in the prepaid telecommunication system.

3. The method of claim 1 wherein the modification action comprises blocking calls.

4. The method of claim 1 wherein the modification action comprises changing service logic in the prepaid telecommunication system.

5. The method of claim 1 further comprising transmitting a repeat instruction to repeat a detection of errors in the prepaid telecommunication system for verifying effects of the modification action.

6. The method of claim 1 wherein transmitting the modification instruction is to a control center for approval.

7. The method of claim 1 wherein the expected response comprises a greeting from the prepaid telecommunication system.

8. The method of claim 1 wherein the expected response comprises a language request for instructions played from the prepaid telecommunication system.

9. The method of claim 1 wherein the expected response comprises a prepaid calling card number request from the prepaid telecommunication system.

10. The method of claim 1 wherein the expected response comprises a validation of the prepaid calling card number from the prepaid telecommunication system.

11. The method of claim 1 wherein the expected response comprises a message indicating the remaining units on a prepaid calling card.

12. The method of claim 11 wherein the remaining units comprise amounts of time.

13. The method of claim 11 wherein the remaining units comprise monetary values.

14. The method of claim 1 wherein the expected response comprises a destination phone number request from the prepaid telecommunication system.

15. The method of claim 1 wherein the expected response comprises a connection to a destination communication device.

16. A software product for a prepaid evaluator system for providing service assurance for a prepaid telecommunication system, the software product comprising:
   prepaid evaluator software operational when executed by a processor to direct the processor to receive an error instruction indicating an actual response and an expected response for a simulated call to the prepaid telecommunication system, determine whether a modification action is needed based on the error instruction, identify the modification action based on the determination that the modification is needed, and transmit a modification instruction to provide the modification action for the prepaid telecommunication system; and
   a software storage medium operational to store the prepaid evaluator software.

17. The software product of claim 16 wherein the modification action comprises reassigning resources in the prepaid telecommunication system.

18. The software product of claim 16 wherein the modification action comprises blocking calls.

19. The software product of claim 16 wherein the modification action comprises changing service logic in the prepaid telecommunication system.

20. The software product of claim 16 wherein the prepaid evaluator software is operational when executed by the processor to direct the processor to transmit a repeat instruction to repeat a detection of errors in the prepaid telecommunication system for verifying effects of the modification action.

21. The software product of claim 16 wherein the prepaid evaluator software is operational when executed by the processor to direct the processor to transmit the modification instruction is to a control center for approval.

22. The software product of claim 16 wherein the expected response comprises a greeting from the prepaid telecommunication system.

23. The software product of claim 16 wherein the expected response comprises a language request for instructions played from the prepaid telecommunication system.

24. The software product of claim 16 wherein the expected response comprises a prepaid calling card number request from the prepaid telecommunication system.

25. The software product of claim 16 wherein the expected response comprises a validation of the prepaid calling card number from the prepaid telecommunication system.

26. The software product of claim 16 wherein the expected response comprises a message indicating the remaining units on a prepaid calling card.

27. The software product of claim 26 wherein the remaining units comprise amounts of time.

28. The software product of claim 26 wherein the remaining units comprise monetary values.

29. The software product of claim 16 wherein the expected response comprises a destination phone number request from the prepaid telecommunication system.

30. The software product of claim 16 wherein the expected response comprises a connection to a destination communication device.

31. A prepaid evaluator system for providing service assurance for a prepaid telecommunication system, the prepaid evaluator system comprising:
   a processor configured to receive an error instruction indicating an actual response and an expected response for a simulated call to the prepaid telecommunication system, determine whether a modification action is needed based on the error instruction, identify the modification action based on the determination that the modification is needed, and transmit a modification instruction to provide the modification action for the prepaid telecommunication system; and an interface configured to transfer the error instruction from the prepaid telecommunication system to the processor and transfer the modification instruction from the processor to the prepaid telecommunication system.

32. The prepaid evaluator system of claim 31 wherein the modification action comprises reassigning resources in the prepaid telecommunication system.

33. The prepaid evaluator system of claim 31 wherein the modification action comprises blocking calls.

34. The prepaid evaluator system of claim 31 wherein the modification action comprises changing service logic in the prepaid telecommunication system.

35. The prepaid evaluator system of claim 31 wherein the processor is configured to transmit a repeat instruction to repeat a detection of errors in the prepaid telecommunication system for verifying effects of the modification action.

36. The prepaid evaluator system of claim 31 wherein the processor is configured to transmit the modification instruction to a control center for approval.

37. The prepaid evaluator system of claim 31 wherein the expected response comprises a greeting from the prepaid telecommunication system.

38. The prepaid evaluator system of claim 31 wherein the expected response comprises a language request for instructions played from the prepaid telecommunication system.

39. The prepaid evaluator system of claim 31 wherein the expected response comprises a prepaid calling card number request from the prepaid telecommunication system.

40. The prepaid evaluator system of claim 31 wherein the expected response comprises a validation of the prepaid calling card number from the prepaid telecommunication system.

41. The prepaid evaluator system of claim 31 wherein the expected response comprises a message indicating the remaining units on a prepaid calling card.

42. The prepaid evaluator system of 41 wherein the remaining units comprise amounts of time.

43. The prepaid evaluator system of 41 wherein the remaining units comprise monetary values.

44. The prepaid evaluator system of 31 wherein the expected response comprises a destination phone number request from the prepaid telecommunication system.

45. The prepaid evaluator system of 31 wherein the expected response comprises a connection to a destination communication device.

* * * * *